F. J. GLEASON.
METHOD OF MAKING RUBBER HOSE.
APPLICATION FILED JAN. 29, 1908.
935,254.
Patented Sept. 28, 1909.
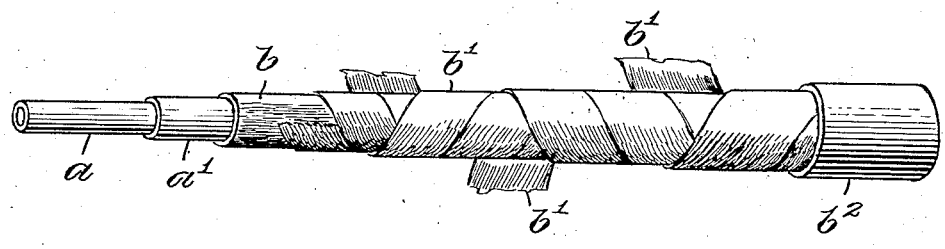
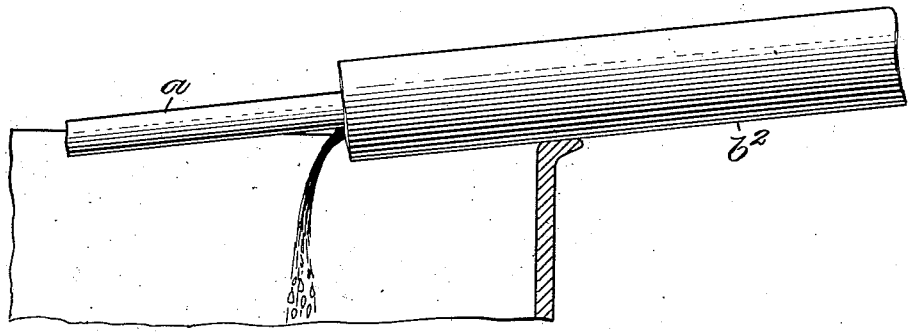
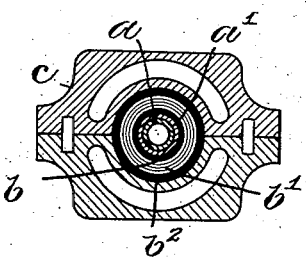
Witnesses:
Walter P. Abell
F. R. Roulstone
Inventor
Frederick T. Gleason
by Dwight Brown Dunlevy May
Attorneys

UNITED STATES PATENT OFFICE.

FREDERICK J. GLEASON, OF WALPOLE, MASSACHUSETTS, ASSIGNOR OF ONE-HALF TO ALVI T. BALDWIN, OF BUFFALO, NEW YORK.

METHOD OF MAKING RUBBER HOSE.

935,254.  
Specification of Letters Patent.  
Patented Sept. 28, 1909.

Application filed January 29, 1908. Serial No. 413,273.

*To all whom it may concern:*

Be it known that I, FREDERICK J. GLEASON, of Walpole, in the county of Norfolk and State of Massachusetts, have invented certain new and useful Improvements in Methods of Making Rubber Hose, of which the following is a specification.

This invention has relation to the manufacture of vulcanized rubber hose such as that used for conveying liquids or fluids.

On the accompanying drawings, I have illustrated one way in which the method may be practiced.

Figure 1 represents a hose pipe in process of construction. Fig. 2 illustrates a vulcanized pipe and shows how the core or mandrel may be withdrawn. Fig. 3 represents a section through the molds with the core or mandrel and hose thereon.

Considerable difficulty has heretofore been experienced in the manufacture of vulcanized rubber hose in withdrawing the core or mandrel from the interior of the hose.

According to my invention, the hose is formed about a mandrel which is, in whole, or in part, formed of some suitable material which fuses or melts at a temperature lower than that destructive to rubber. After vulcanization, the core, which is melted, may be easily withdrawn without the necessity of expanding the hose or otherwise stretching it.

The core or mandrel is illustrated as consisting of a cylinder $a$ which is illustrated as a tube, and which is made of cast iron or other material which does not fuse except at a high temperature. About this cylinder is molded a sheath or layer $a'$ of the fusible material. These two portions $a$ $a'$ constitute the core or mandrel about which the hose is constructed. I generally prefer to place about the core a layer $b$ of rubber which may be green or which may have been previously vulcanized. About this layer are wrapped as many layers of rubber, canvas or the like as may be desired, these layers or wrappings being indicated at $b'$. Around them is placed an exterior layer $b^2$ which will preferably be of rubber. The core with the various layers thereon, which constitute the hose, is placed between molds $c$ $c$ as shown in Fig. 3, and is subjected to heat and pressure sufficient to effect the vulcanizing of the hose. The ends of the molds are preferably closed.

The fusible material, as stated, is of such nature that it melts at a temperature lower than that destructive to rubber. I preferably employ lead, tin and bismuth which, according to their proportions, may be caused to melt at a low temperature, say from 199° upward. An alloy of five parts by weight of bismuth, three parts by weight of tin and two parts by weight of lead serves excellently for the purpose desired, since it melts at approximately 199° to 201° Fahrenheit and may be melted by inserting it in boiling water so that, if by any chance, particles of the core remain in the hose, they may be removed by inserting it in a vat of boiling water. This alloy melts without ebullition and without giving off gases so as to cause an expansion within the tube. The vulcanizing temperature, to which the hose is subjected, is sufficient to melt the sheath or layer $a'$ of the core or mandrel so that, after the hose has been removed from the molds, the molten material may be permitted to flow out from its end, as shown in Fig. 2, to permit the easy removal of the inner portion $a$ of the core.

The core is initially rigid so that it will sustain and maintain in place the layers which constitute the hose.

I claim:—

The herein described method of making vulcanized rubber hose which consists in forming a tubular structure of vulcanizable material about a mandrel or core having an external sheath of a metallic alloy fusible below a temperature destructive to the article, vulcanizing the tube thus formed, melting the fusible sheath, and withdrawing the said mandrel or core.

In testimony whereof I have affixed my signature, in presence of two witnesses.

FREDERICK J. GLEASON.

Witnesses:
P. W. PEZZETTI,
A. L. FOLSOM.